June 20, 1961     S. HOPFER     2,989,699

MULTI-MODE STANDING WAVE INDICATOR

Filed Sept. 7, 1955

INVENTOR
SAMUEL HOPFER

BY *Ralph B. Stewart*

ATTORNEY

United States Patent Office 2,989,699
Patented June 20, 1961

2,989,699
MULTI-MODE STANDING WAVE INDICATOR
Samuel Hopfer, Brooklyn, N.Y., assignor to PRD Electronics, Inc., a corporation of New York
Filed Sept. 7, 1955, Ser. No. 532,888
5 Claims. (Cl. 324—95)

This invention relates to standing wave indicators.

The invention is especially useful for the measurement of standing wave ratio where different transmission modes are present in the wave energy, and an object of the invention is to devise a standing wave indicator to indicate the standing wave for any particular mode without causing intermode coupling.

My invention is especially useful in connection with wave transmission in a so-called "flat guides" in which several different transmission modes may be present simultaneously. The flat guide is one in which the width of the guide is relatively large with respect to the height. For example, the guide may have an internal width dimension of 0.74 inch and an internal height dimension of 0.14 inch.

The presence of discontinuities in a flat wave guide introduces coupling between various modes of transmission, and such discontinuities are to be avoided. For this reason, the usual standing wave indicator employing a pick-up probe cannot be used, and another object of the invention is to devise a pick-up element which reduces the amount of intermode coupling to a minimum. According to my invention, the wave guide section in which standing waves are established is provided with a transverse slot formed in one broad wall thereof and extending entirely across the wave guide, and provision is made to shift the position of the pick-up slot to different positions along the length of the wave guide section. The energy transmitted through the transverse slot is transmitted through a branch wave guide section to a suitable detector.

The width of the transverse slot is made variable so as to control the amount of the coupling between the main wave guide section and the branch section.

My standing wave indicator is capable of measuring the reflection coefficients of the various modes independently of each other.

Figure 1:
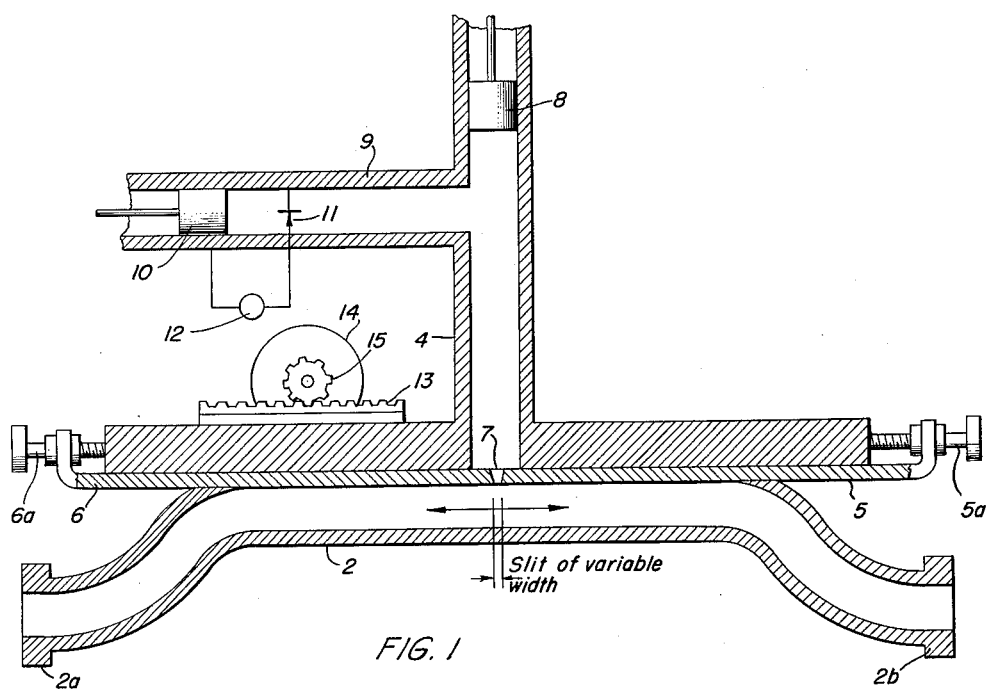
Figure 2:
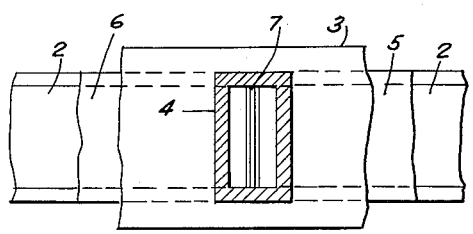

One suitable embodiment of my invention is illustrated somewhat diagrammatically in the accompanying drawing in which FIG. 1 shows the principal parts of the indicator in vertical section and FIG. 2 is a cross-section of FIG. 1 showing the coupling aperture thereof.

The indicator comprises a rectangular wave-guide section 2 having coupling flanges 2a and 2b at the ends thereof by which the indicator may be connected between a suitable source of wave energy and a suitable load, standing waves being established within the section 2. The middle portion of the wave guide section 2 is off-set with respect to the axis of the coupling flanges 2a and 2b, and the upper broad wall of the off-set portion is removed and is replaced by a sliding wall structure 3 forming a flange for a branch wave guide section 4. Preferably branch line 4 has the same transverse dimensions as the main section 2. Interposed between plate 3 and section 2 is a pair of plates 5 and 6 which are spaced apart at their inner edges to form a coupling aperture or slit 7 extending entirely across the width of the section 2. The adjacent end edges of plates 5 and 6 are chamfered as shown in the drawing to provide a V-shaped slit. Aperture plates 5 and 6 are mounted upon the plate 3 for adjustment towards and away from each other by suitable means represented by the adjusting screws 5a and 6a so as to vary the width of the coupling slit 7. A movable shorting plunger 8 is arranged within the upper end of branch line 4. Another wave guide section 9 branches off from the section 4 between the plate 3 and the plunger 8 and is provided with a shorting plunger 10 in the outer end thereof. A wave detector 11, such as a crystal, is mounted in line section 9 and energizes an indicating meter 12. One or more additional stub line sections like section 9 may be branched off from line section 4 at different points along its length, each including its own shorting plunger and acting as mode traps.

The cover plate for section 2 formed of plate 3 and the parts connected thereto is mounted for sliding movement along the section 2 to vary the position of the coupling slit 7 along the main wave guide section. Suitable guide structure not shown is provided for maintaining the cover plate in proper alignment with the wave guide, and the entire slide structure is arranged to be moved by suitable means such as a rack 13 secured to the plate 3 and driven from an operating knob 14 through a pinion 15 which is journaled on a fixed axis.

The shorting plunger 8 in the branch line 4 is driven by a micrometer screw (not shown) and serves as a mode selector, that is, it selects the mode to be eliminated from stub arm 9. By moving this plunger it is possible to prevent a selected mode from being coupled into the stub line 9 containing the detector. By this arrangement it is possible to suppress either the first mode or the third mode and prevent energy of these modes from entering crystal line 9. The position of plunger 8 from the terminal plane of the crystal line 9 in order to suppress a mode in the crystal line will be very near an odd integral number of quarter wave lengths within the guide. Adjustment of plunger 10 in stub line 9 is made to provide maximum indication on meter 12.

In a particular embodiment of the invention designed for operation within the range of 10 kmc./sec. to 40 kmc./sec., the indicator was embodied in a wave guide section having transverse dimensions of 0.740 inch by 0.140 inch, and the width of the transverse coupling slit for frequencies between 28 and 38 was adjusted to 0.002 inch. At the frequency range of 10 to 40 kmc., the wave guide of the size indicated above will permit only the $TE_{10}$, $TE_{20}$, $TE_{30}$ and $TE_{40}$ modes to be propagated. Although these four modes may simultaneously propagate at the high frequency end of the range, the indicator as described and illustrated herein will handle only two modes which propagate simultaneously. It is possible to separate the modes and indicate them separately by reason of the fact that each of the non-degenerate modes has a different guide wavelength. Since the narrow coupling slit extends entirely across the width of the main wave guide, it does not provide any coupling between the propagating modes, since the geometry of the slit is independent of the width coordinate.

In order to use the standing wave indicator properly, two types of calibrations must first be made. One is the calibration of the micrometer driven mode-selector plunger 8, to determine the positions which will suppress either of the propagating modes. The other calibration accomplishes the transformation of the physical terminal plane of the instrument itself to the scale of the instrument. These calibration data naturally depend upon the frequency.

In calibrating the mode selector for first and third mode suppression, the following procedure is followed. In the case of the first mode, the various suppression positions are found simply by terminating the standing wave indicator in a short circuit. The carriage or cover plate is then moved to the position of maximum indication on meter 12. In this position, the detected signal is suppressed with the mode selector and the suppression positions recorded. The suppressed signal level in this case will be in the noise region. The first mode may be launched from the single mode .280"×.150" waveguide and transmitted through a straight tapered section into the .740"×.140" "flat" waveguide connected to the indicator. The possible third mode excited by the tapered section is negligible.

The determination of the third mode suppression positions is complicated by the fact that the excitation of a third mode is normally accompanied by the presence of the first mode. It is therefore difficult to say at which position of the mode selector the third mode is suppressed. One way of overcoming this difficulty is to use an adjustable post accurately centered in the top face of the "flat" guide to generate the third mode when the flat guide is energized from a first mode source. The standing wave indicator which follows this device is terminated by way of a tapered section connected to a matched termination built into a 0.280"×0.140" guide section. The third mode is totally reflected by the tapered section, while the first mode is very nearly matched. The mode selector is then adjusted until VSWR values in the neighborhood of 1.1 are obtained. The guide wavelength of the residual standing wave pattern is checked, to ascertain that only the first mode is present.

The transformation of the actual terminal plane of the standing wave indicator to the scale of the instrument is accomplished by placing a short at the end of the indicator and recording the corresponding null position on the scale. This is done for each mode separately.

Although the standing wave indicator, as described above, is designed to handle only two modes simultaneously, the introduction of additional mode selectors in the form of adjustable stub lines, will permit the handling of more than two modes.

I claim:

1. A standing wave indicator comprising, a main waveguide section having two broad walls and two narrow walls, a sliding plate forming at least a portion of one broad wall thereof, said plate being slidable along the length of said main guide section and having a narrow coupling slit formed therein transversely of said section and extending throughout the width of said waveguide section, movement of said sliding plate causing movement of said coupling slit along the length of said section to effect sampling of standing wave energy within said section at different points along its length, a branch waveguide section of rectangular form of the same transverse dimension as said main section and having one end thereof coupled to said main section through said coupling slit and provided with a short-circuiting plunger slidable in a section thereof remote from said slit, means for extracting wave energy from said branch section at a point intermediate said slit and said plunger, and means for detecting the extracted wave energy.

2. A standing wave indicator according to claim 1, wherein said sliding plate is formed of two aligned plate sections joined for movement as a unit and having their adjacent ends spaced apart to form said coupling slit, and including means for adjusting the relative positions of said plate sections to vary the width of said coupling slit.

3. A standing wave indicator according to claim 2, wherein the adjacent ends of said plate sections are chamfered to provide a V-shaped coupling slit between said plate sections.

4. A standing wave indicator according to claim 1 wherein said means for extracting wave energy from said branch section comprises a stub line waveguide section coupled to said branch section, and said wave energy detecting means is located within said stub line at a point removed from said branch section, and a short-circuiting plunger slidably mounted in the end portion of said stub line.

5. Microwave apparatus for separating one wave mode from another comprising, a main waveguide section for transmission of wave energy comprising two transmission modes, said section being of rectangular form having two broad walls and two narrow walls, a branch waveguide section of rectangular form of the same transverse dimensions as said main section and having one end thereof connected with said main section through a narrow slot formed transversely through a broad wall of said main section and extending throughout the broad width of both of said sections, whereby both of said modes are transmitted into said branch section without coupling between said modes, a third waveguide section coupled to said branch section through an aperture in a broad wall thereof, and a short-circuiting element located within said branch section at a point beyond said coupling aperture a distance to decouple one of said modes from said third waveguide section.

References Cited in the file of this patent

UNITED STATES PATENTS

| | | |
|---|---|---|
| 2,413,939 | Benware | Jan. 7, 1947 |
| 2,488,378 | Coltman | Nov. 15, 1949 |
| 2,571,055 | Nordsieck | Oct. 9, 1951 |
| 2,573,746 | Watson | Nov. 6, 1951 |
| 2,579,327 | Lund | Dec. 18, 1951 |
| 2,591,980 | Hofweegen | Apr. 8, 1952 |
| 2,642,494 | Zaslavsky et al. | June 16, 1953 |
| 2,644,884 | Finke | July 7, 1953 |
| 2,783,378 | Vogeley et al. | Feb. 26, 1957 |